United States Patent [19]

Reilly

[11] 4,126,364

[45] Nov. 21, 1978

[54] CONNECTOR FOR FRAME MEMBERS

[75] Inventor: Frederick W. Reilly, Islington, Canada

[73] Assignee: Miranda Investments Limited, Toronto, Canada

[21] Appl. No.: 856,301

[22] Filed: Dec. 1, 1977

[51] Int. Cl.² .................................................. F16B 12/00
[52] U.S. Cl. ........................................ 312/140; 52/280;
   312/257 SK; 312/263
[58] Field of Search ............ 312/263, 264, 140, 257 R,
   312/257 SK; 403/172, 176; 52/126, 282, 280

[56]           References Cited
        U.S. PATENT DOCUMENTS

| 2,058,263 | 10/1936 | Rosendale | 312/257 R |
| 2,174,180 | 9/1939 | Rand | 312/140 |
| 2,344,161 | 3/1944 | Michaels | 312/140 |
| 2,580,029 | 12/1951 | Krauss | 312/140 |
| 3,276,832 | 10/1966 | Reilly | 220/84 |
| 3,350,828 | 11/1967 | Russell | 52/282 |
| 3,521,047 | 7/1970 | Smith | 52/282 |
| 3,884,002 | 5/1975 | Logie | 52/285 |

Primary Examiner—Mervin Stein
Assistant Examiner—Alex Grosz
Attorney, Agent, or Firm—George H. Riches and Associates

[57]             ABSTRACT

A connector for securely connecting prefabricated sections consisting of horizontal and vertical frame members interconnected into a unitary structure by the connector consisting essentially of a body arranged to slidably fit into a connector-receiving cavity adjacent one end of a vertical member, a threaded extension arranged to be entered into a threaded orifice carried at the junction of a pair of abutting horizontal members and means, such as a grub-screw, for tightening the body in said cavity in the assembled position of the furniture structure.

7 Claims, 5 Drawing Figures

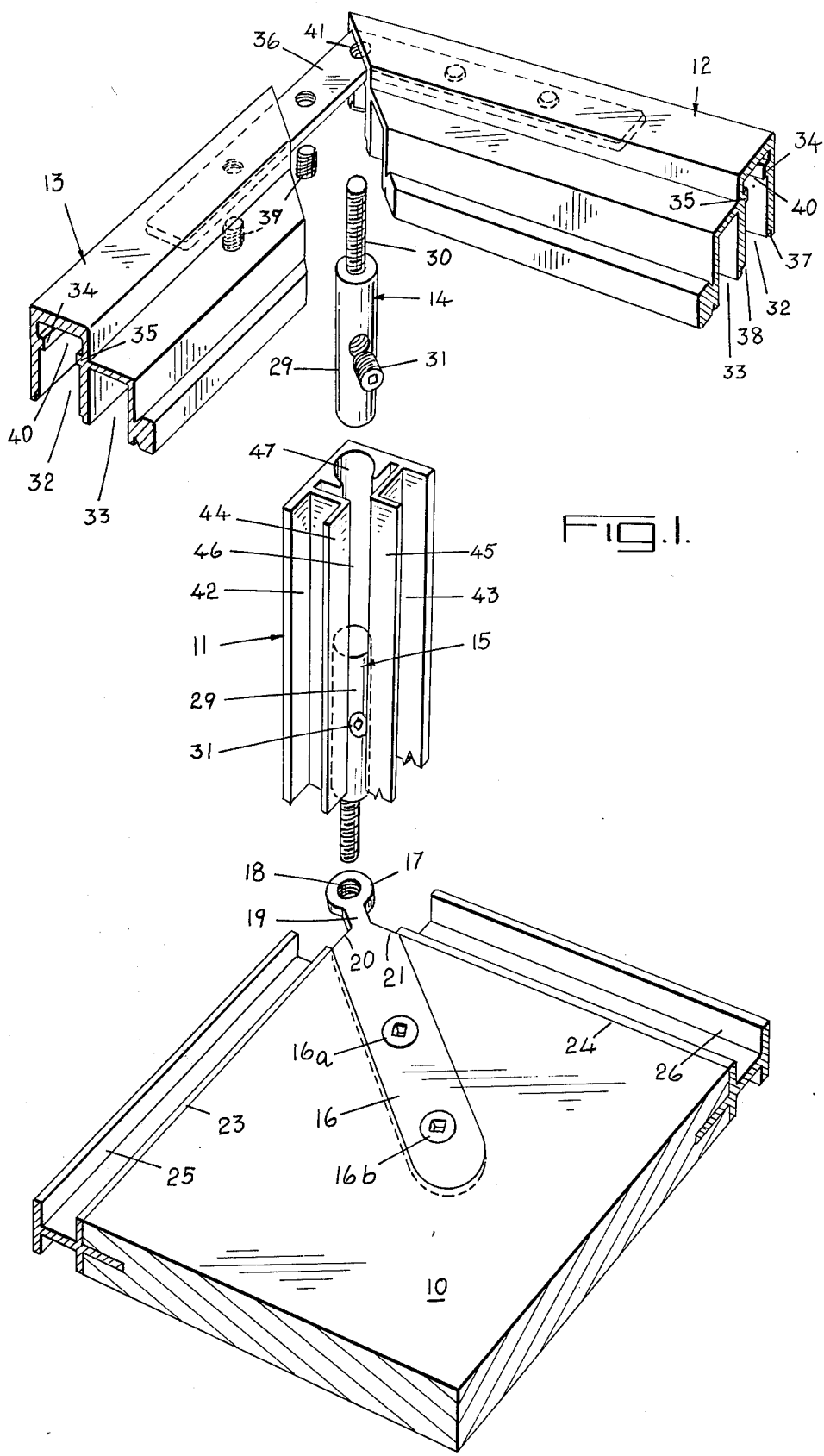

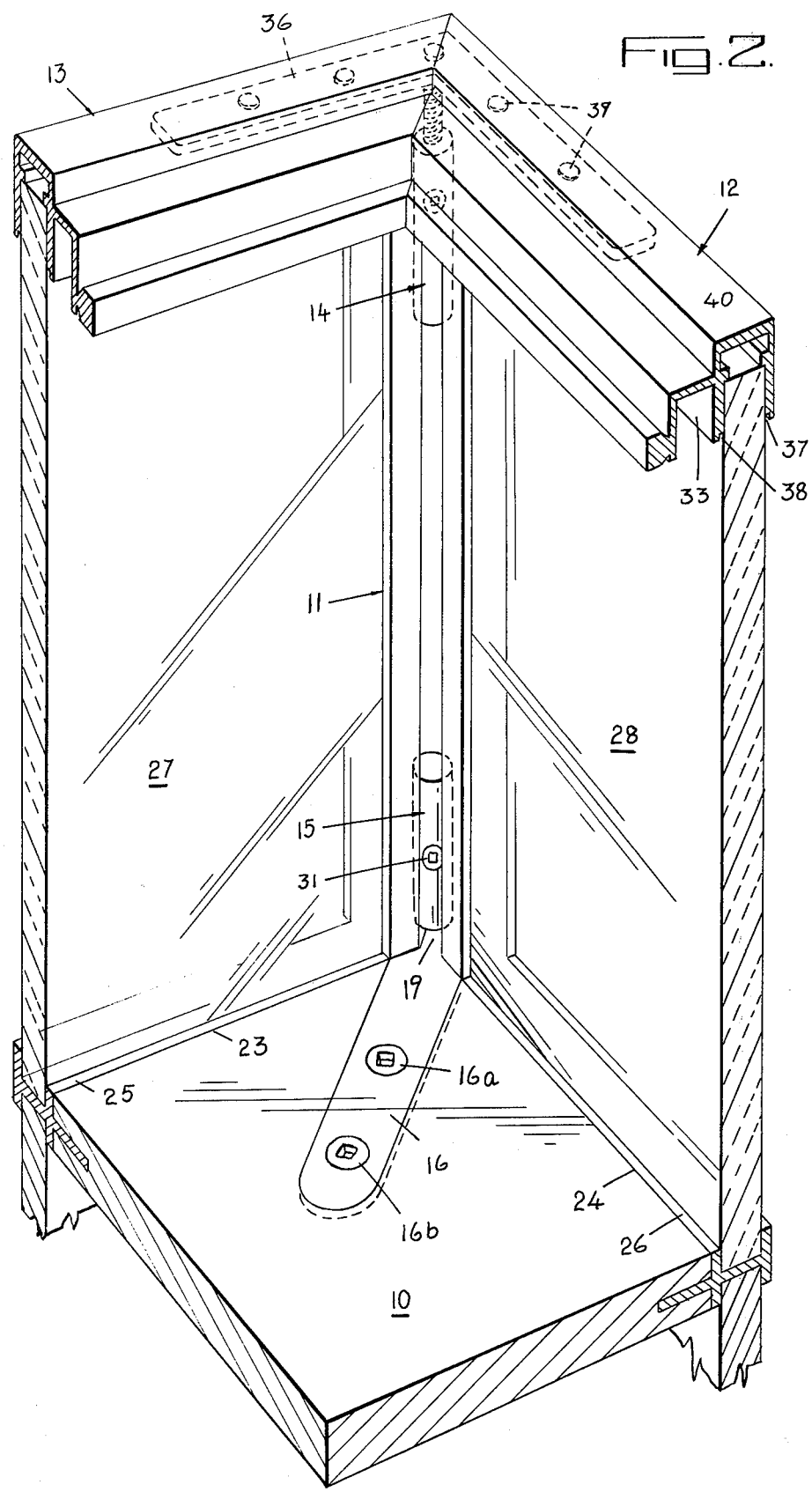

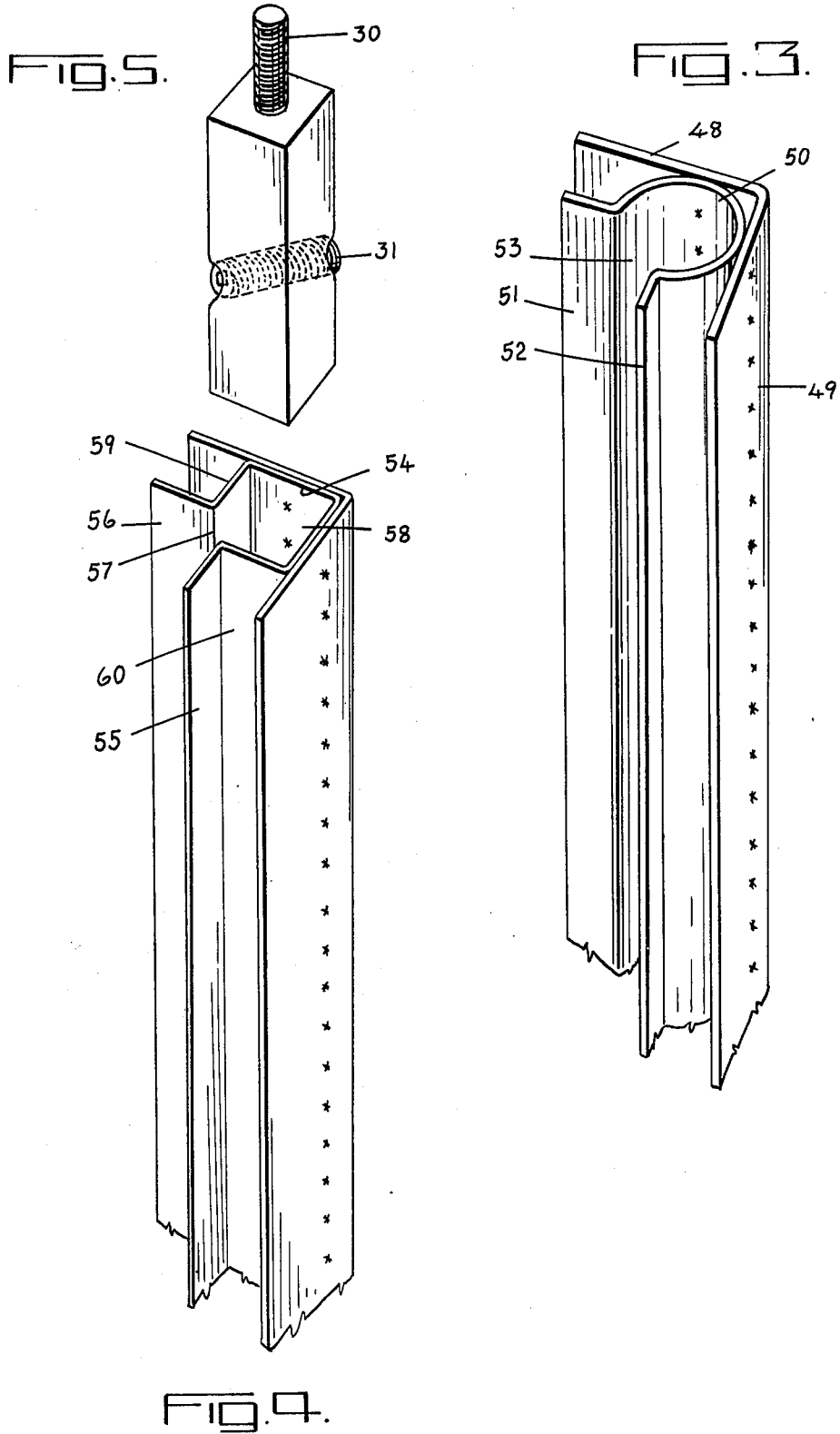

CONNECTOR FOR FRAME MEMBERS

BACKGROUND OF THE INVENTION

My prior U.S. Pat. No. 3,276,832 dated Oct. 4, 1966 related to a prefabricated sectional structure and in particular, to a joining system by which the horizontal members have each corner removably connected to its adjacent supporting post, consisting essentially of an elongated body having an outwardly facing front face and an inwardly facing longitudinal V-channel, said body having a plurality of modular spaced holes extending horizontally and centrally through the front face of the body in registration with the V-shaped channel. In this construction, when the structure was assembled into a showcase, for example, the outwardly facing channel had to be covered by a closure member extending the full length of the post. This closure member somewhat detracted from the aesthetic appearance of the cabinet.

The partition system disclosed in Charles F. Logie's U.S. Pat. No. 3,884,002 dated May 20, 1975 described a system for connecting at least two movable partitions which employs a connector having a first axis extending from one of the partitions to the other. The connector is secured to one partition by means of a screw entered through the partition transversely through the connector. The other partition is provided with a pin extending transversely to the axis of the connector, the pin and the connector being securely fastened in their respective apertures to secure the partitions in the assembled position.

British Pat. No. 935,434 dated Mar. 1, 1960 to Alfred Imhof Limited described a corner structure for a section framework consisting of a three-armed connector member for connecting three hollow frame members of extruded manufacture, in end-to-end relationship. Each arm is split adjacent the end thereof to be expanded by a self threading screw into frictional engagement with the hollow interior of the frame member into which it is inserted when assembled.

OUTLINE OF THE INVENTION

The present invention has for its principal object, the provision of a simple means of connecting the various frame members of knock-down furniture structure and at the same time, avoiding outside disfiguration of the unit when assembled.

The invention essentially consists of a framing system for a knock-down structure consisting of a plurality of prefabricated sections of horizontal frame members supported on vertical members such as posts, and a connector for securely connecting one end of a vertical member to the abutting ends of a pair of horizontal frame members, said connector comprising a body arranged to slidably fit into a connector-receiving cavity adjacent said one end of the vertical member, a threaded extension arranged to be entered into a threaded orifice carried at the junction of the abutting portions of a pair of horizontal members, and screw means entered transversely through the body and engageable with the inside wall of the cavity to secure the body in said cavity in the assembled position.

DESCRIPTION OF THE INVENTION

Brief Description of the Drawings

The invention will now be described with reference to the embodiments illustrated in the accompanying drawings, but it is to be understood that the present invention is not limited in its use to the structures illustrated in the drawings which set forth its use for assembling prefabricated framing members.

In the drawings,

FIG. 1 is an exploded perspective view to illustrate the connector of the present invention and the several parts to be combined therewith;

FIG. 2 illustrates the structure of Figure in assembled position with the closing side panels in position;

FIGS. 3, 4 and 5 illustrate alternative post and connector structures.

DESCRIPTION OF THE PREFERRED EMBODIMENT

FIG. 1 illustrates the several parts of the corner of a knock-down furniture structure consisting essentially of a base 10, a corner post 11, horizontal frame members 12, 13 and, post connectors generally indicated by the numbers 14,15.

The base 10 includes a mounting plate 16 extending diagonally across the base at an angle of approximately 45° and fastened to the base by screws 16a and 16b. The mounting plate 16 has a projecting portion 17 formed with a threaded hole 18, the projecting portion 17 being reduced in width to form a neck 19 and shoulders 20,21 which align with the outside edges 23, 24 of the base 10. Mounted on the outside edges 23,24 of the base 10 are channel members 25, 26 which support the bottom edges of panels 27, 28 as shown in FIG. 2.

In the present embodiment, all of the connectors are the same and consequently only one of them will be described. The connector 14 comprises a cylindrical body 29, an axial threaded extension 30 of reduced diameter relative to the diameter of the body and a grub-screw 31 which is screw-threaded transversely through a threaded orifice in the body.

In the embodiment illustrated in FIGS. 1 and 2, the horizontal frame members 13, 12 are of extruded manufacture and are identical in cross-section. Each of the frame members 12, 13, consist essentially of a pair of U-shaped channels 32, 33 in side-by-side relationship, the channel 32 being designated the outer channel and the channel 33 being designated the inner channel. Adjacent the bottom of the outer channel 32 is a pair of guides 34, 35 projecting inwardly from opposite walls of the channel 32. This forms a support for a frame connector to be described later and an entrance slot 40 therebetween for the frame connectors and other purposes. The free ends of the walls forming the channel 32 are formed with inwardly facing grooves 37, 38. The channels 32, 33 receive the usual panelling which may consist of sheet metal, plastic, glass etc. which are used to enclose the structure.

As shown in FIGS. 1 and 2, the ends of the frame members 12, 13 which are to be joined together, are mitred and the mitred ends are firmly joined together by a square connector shown as an L-bar 36, one leg of which slides on guides 34, 35 of frame member 12 and the other leg on guides 34, 35 of frame member 13. Each leg of the connector is provided with two grub-screws 39. At the junction of the two legs of L-bar 36, there is provided a threaded hole 41 for receiving the threaded extension 30 of the connector 14 to be described. This aperture or hole 41 is similar to the threaded hole 18. By tightening the grub-screws 39 with a suitable tool which may be entered through the slot 40, the abutting mitred ends can be frictionally joined together and thus make a tight union between the horizontal frame members.

The corner post 11 shown in FIGS. 1 and 2 may also be of extruded manufacture. It has a pair of outside U-shaped channels 42, 43 disposed at right angles to each other, the channels 42, 43 being arranged to register with channels 32, in the frame members 12, 13 and channel members 25, 26 in the base 10 when assembled. The channels 42, 43 receive the edges of the usual enclosing panels. The inner walls 44, 45 of the channels 42, 43 are spaced apart, as shown in the drawings, to form an entrance slot 46 therebetween, which slot aligns with the plate 16 and the mitred joint of the frame members 12, 13. The entrance slot provides an entrance to an inner post-connector receiving cavity 47. This cavity has the same transverse cross-section as post connectors 14, 15. In the embodiment illustrated in FIGS. 1 and 2, the post connectors 14, 15 are cylindrical in shape and the cavity 47 is of correcponding shape and size, so that the connector slidably fits into the cavity.

FIG. 3 illustrates a horizontal frame member which is formed of two pieces of rolled formed steel. The first piece of the horizontal frame member is made of L-angle iron to form the outer walls 48, 49 and the second piece is formed to have a hollow circular shaped wall 50, the ends of the wall terminating in wings 51, 52 which are at right angles to each other and form therebetween an entrance slot 53. When nested as shown, these two pieces are joined together by spot welding at intervals. The wings 51, 52 cooperate with outer walls 48, 49 to form panel receiving channels. When these two parts are thus assembled, they are similar to the post construction shown with reference to FIGS. 1 and 2. The post connector is mounted in the hollow body 50 with the grub-screw facing the entrance slot 53.

FIG. 4 shows a further variation in the shape. It is constructed essentially the same as that shown in FIG. 3 except the second piece has a hollow, substantial rectangular body 54 which nests into the corner of the horizontal frame and has the free ends of sides 59, 60 which are separated to form wings 55, 56 with an entrance slot 57 to provide an entrance into the rectangular post-connector receiving cavity 58 formed by the hollow rectangular body 54. In this illustrated embodiment, the post connector must be rectangular in cross-section as shown in FIG. 5, to slidably fit into the cavity 58.

The assembling of the frame members and the posts is clearly illustrated by FIGS. 1 and 2. As all frames and posts are assembled in the same manner, it is only necessary to describe the assembly of one corner of the structure. In accordance with usual practice, the assembling would start with mounting the posts on the base, and then continuing upwardly. Consequently, only the assembly at one corner has been described. The first step, of course, is to mount all the plates 16 on the base 10 at the respective corners and other required locations at the corners, the plate 16 being mounted at an angle of -45° with shoulders 20, 21 at the base edges and the extension 18 overhanging so that when post 11 is mounted in place the channels 42, 43 of the post will align with the respective channels members 25, 26 on the base. The connector 15 is then mounted in position by first threading extension 30 into threaded hole 18. The post 11 is then mounted by sliding the connector body 29 into cavity 46 and lowering post until the bottom end thereof is engaged by shoulders 20, 21. When so positioned grub-screw 31 is tightened to frictionally grip the inner wall of the cavity 47. This is done by a suitable tool entered through the entrance slot 46 to turn the screw until sufficiently tightened to bite into the cavity wall without distorting the post wall. After mounting all the posts on the base, the next step is to mount the horizontal frame members.

A pair of horizontal frame members 12, 13 are then connected together at the mitred corners by means of a L-bar. As shown, the L-bar 36 is slid into the slot formed by guides 34, 35 of the respective frame members and the grub-screws 33 tightened by the appropriate tool entered through the channels 32. A connector 14 is then mounted in place by threading extension 30 into threaded hole 41 with its grub-screw facing inwardly so that its tool receiving recess is facing inwardly. The frames are then lowered with the connector entering the cavity 47 and the frames are supported on top of the corner post 11. In this position, the flanges formed by grooves 37, 38 overlap the top end of the post and prevent twisting movement of the post. It is also mentioned that tool receiving recess of the grub-screw 31 should be positioned to face entrance slot 46. When the several parts are appropriately positioned, the grub-screw 31 is tightened to frictionally engage the inner wall of cavity 47.

Although the disclosure describes and illustrates preferred embodiments of the invention, it is to be understood that the invention is not restricted to these particular embodiments.

| Figures 1 through 5 |
|---|
| 10 - base |
| 11 - corner post |
| 12 - horizontal frame members |
| 13 - horizontal frame members |
| 14, 15 - connectors |
| 16 - mounting plate |
| 16a, 16b - screws |
| 17 - projecting portion |
| 18 - threaded hole |
| 19 - neck |
| 20, 21 - shoulders |
| 23, 24 - outside edges |
| 25, 26 - channel members |
| 27, 28 - panels |
| 29 - cylindrical body |
| 30 - axial threaded extension |
| 31 - grub-screw |
| 32, 33 - U shaped channels |
| 34, 35 - guides |
| 36 - square connector |
| 37, 38 - grooves |

-continued

Figures 1 through 5

39 - grub-screw
40 - entrance slot
41 - threaded hole
42 ⎫
43 ⎭ channels in post
44 ⎫
45 ⎭ inner walls of channel
46 - entrance slot
47 - post connector receiving cavity
48 - outer walls
49 - outer walls
50 - circular wall
51 ⎫
52 ⎭ wings
53 - entrance slot
54 - body
55 ⎫
56 ⎭ wings
57 - entrance slot
58 - post-connector receiving cavity
59 ⎫
60 ⎭ sides

What I claim is:

1. In a framing system for a knockdown structure consisting of prefabricated sections of horizontal frame members and vertical frame members, interconnected into a unitary structure, and connecting means joining a pair of horizontal members in abutting relationship, a one piece connector for securely connecting one end of a vertical frame member to the abutting ends of the pair of interconnected horizontal frame members, said connector comprising an elongated body arranged to frictionally and slidably fit into a connector receiving cavity, said cavity having an inwardly facing entrance slot adjacent said one end of the vertical frame member, a threaded extension extending axially from the body in a longitudinal direction and arranged to be threaded into a threaded orifice in the connecting means said orifice being located in alignment with the abutting ends of the pair of horizontal members, and releasable means for securing the body in said cavity against longitudinal movement in said cavity in assembled position whereby the vertical frame member and horizontal frame member is rigidly secured together.

2. A framing system according to claim 1 including a base and means mounting the post on the base comprising a second connector having a cross section corresponding in shape and size to the cross-section of the channel to slidably fit into the channel, said second connector further having a threaded extension arranged to be threaded into a threaded orifice in said base and a grub-screw threaded cross-wise through the connector whereby on inserting said second connector into said channel adjacent the base of the post with the extension threaded into a threaded orifice in said base and then tightening the grub-screw to frictionally engage the wall of the channel, the post is mounted on the base.

3. In a framing system for an article of furniture including in combination a base member, one or more horizontal frame members, and one or more post members arranged for mounting on the base member to support the horizontal members, each of said post members having a longitudinal channel extending throughout the length of the post, said channel having an inwardly facing entrance slot when mounted on said base; a connector having an elongated body and a cross-section corresponding in shape and size to the cross-section of the channel to slidably fit into said channel, said connector further having a threaded extension extending axially from the body in a longitudinal direction and arranged to be threaded into a threaded orifice in said base and a grub-screw threaded cross-wise through the connector whereby on inserting said connector into said channel with the extension threaded into the orifice with the head of the grub-screw facing said entrance slot, said grub-screw can be tightened to frictionally engage the wall of the channel and block movement of the connector within the channel, and the said post is securely mounted on the base.

4. In a framing system for an article of furniture, in combination, at least one horizontal frame member of extruded manufacture, and at least one post of extruded manufacture arranged to support the horizontal member, each post having a longitudinal channel extending throughout the length of the post, said channel having a longitudinal slot facing inwardly into the interior of the article of furniture; a first connector having a cross-section corresponding in shape and size to the cross-section of the channel to slidably fit into said channel, said connector further having a threaded extension arranged to be threaded into a threaded orifice carried by the horizontal frame member and a grub-screw threaded crosswise through the connector, whereby on inserting said connector into said channel with the extension threaded into the orifice and the grub-screw tightened through said slot to frictionally engage the wall of the channel, the horizontal member and the post are securely interlocked.

5. In a framing system for an article of furniture, in combination, two horizontal members of extruded manufacture joined together in end-to-end relationship, a base, a post arranged to support the horizontal members at their junction, each post having a longitudinal channel extending throughout the length of the post, said channel having a longitudinal entrance slot facing inwardly into the interior of the article of furniture, and means for securely attaching the post to the base and to the horizontal members, said means comprising a first connector having an elongated body of a cross-section corresponding in shape and size to the cross-section of said channel to slidably fit into said channel, said first connector having a threaded extension extending axially from the body in a longitudinal direction and arranged to be threaded into a threaded first orifice carried adjacent the junction of the horizontal members and a grub-screw threaded crosswise through the first connector, whereby on inserting said first connector into said channel adjacent the top end with the extension threaded into the first orifice and the head of the grub-screw facing said entrance slot, said grub-screw can be tightened through said slot to frictionally engage the wall of the channel, the horizontal members and the post are thereby securely interlocked.

6. A framing system according to claim 5 including a second threaded orifice in the base member adjacent the corner directly below the said junction, a second connector, corresponding to the first connector, fitted into said channel adjacent the bottom end of the post with its threaded extension threaded into said second orifice whereby upon tightening the grub-screw, the said second connector is secured in said last mentioned channel and the post is securely attached to the base.

7. In a framing system for an article of furniture of extruded manufacture, in combination, a connector for connecting a vertical frame member to a horizontal frame member in which the vertical frame member is formed with a longitudinal channel extending throughout its length, said channel having an inwardly facing entrance slot opening into the channel, said connector comprising an elongated body arranged to slidably fit into said channel, a threaded extension extending axially from the body in a longitudinal direction and arranged to be threaded into a threaded orifice carried by the horizontal frame member and a grub-screw threaded crosswise through the connector to frictionally engage the inside wall of the longitudinal slot in assembled position with the head of the grub-screw facing said entrance slot and block movement of the connector within the channel when the grub-screw is tightened.

* * * * *